US010924786B2

(12) United States Patent
Huang et al.

(10) Patent No.: US 10,924,786 B2
(45) Date of Patent: Feb. 16, 2021

(54) METHOD FOR SHAPING VIDEO STREAMS AND SET-UP BOX USING THE METHOD

(71) Applicant: NANNING FUGUI PRECISION INDUSTRIAL CO., LTD., Nanning (CN)

(72) Inventors: Rui-Tang Huang, New Taipei (TW); Chia-Ming Yeh, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/406,675

(22) Filed: May 8, 2019

(65) Prior Publication Data

US 2020/0359068 A1 Nov. 12, 2020

(51) Int. Cl.
*H04N 21/238* (2011.01)
*H04N 21/2387* (2011.01)
*H04N 21/24* (2011.01)

(52) U.S. Cl.
CPC ... *H04N 21/23805* (2013.01); *H04N 21/2387* (2013.01); *H04N 21/2401* (2013.01)

(58) Field of Classification Search
CPC ..... H04L 67/02; H04L 63/1441; H04L 12/28; H04N 21/2381; H04N 21/2402
USPC ........................................................ 709/231
See application file for complete search history.

(56) References Cited

U.S. PATENT DOCUMENTS

| 9,003,527 | B2 | 4/2015 | Bhagwat et al. |
| 9,049,225 | B2 | 6/2015 | Jana et al. |
| 10,506,237 | B1* | 12/2019 | Liu ...................... H04N 19/152 |
| 2013/0332623 | A1* | 12/2013 | Gahm ..................... H04L 47/38 |
| | | | 709/234 |
| 2016/0057467 | A1* | 2/2016 | Yamagishi ....... H04N 21/23439 |
| | | | 725/25 |
| 2016/0192029 | A1* | 6/2016 | Bergstrom .............. H04L 12/18 |
| | | | 725/109 |
| 2017/0026713 | A1* | 1/2017 | Yin ..................... H04N 21/6587 |
| 2017/0070758 | A1* | 3/2017 | Phillips .............. H04N 21/6408 |
| 2017/0164066 | A1* | 6/2017 | Huang ............... H04N 21/2393 |
| 2018/0167436 | A1* | 6/2018 | Han ...................... H04L 43/0888 |
| 2018/0212882 | A1* | 7/2018 | Phillips .............. H04N 21/6168 |
| 2018/0241836 | A1* | 8/2018 | Arsenault ........... H04L 65/4084 |
| 2019/0182518 | A1* | 6/2019 | Mittal ............... H04N 21/26258 |
| 2019/0327505 | A1* | 10/2019 | Schwimmer ..... H04N 21/23424 |
| 2019/0334803 | A1* | 10/2019 | Ickin ................... H04L 43/0852 |
| 2020/0037045 | A1* | 1/2020 | Mahvash ......... H04N 21/44004 |

(Continued)

*Primary Examiner* — Mahran Y Abu Roumi
(74) *Attorney, Agent, or Firm* — ScienBiziP, P.C.

(57) ABSTRACT

A method for shaping video streams applied to a first set-up box collects watching history of user and previous playback information and analyzes same to generate multiple bitrate combinations. First and second stream buffers of two respective video streams are initialized according to the bitrate combinations and the history. First and second image chunks of the first and second video streams are downloaded and stored in the first and second stream buffers and displayed in a first display device connecting to the first set-up box. Buffer ratios are determined and when the buffer ratio of the first is equal to the second, image chunks are continued to be downloaded from the second. If the buffer ratio of the first is not equal to the second, the video stream with smaller stream buffer ratio is selected for continuing to download the image chunks.

2 Claims, 5 Drawing Sheets

(56) References Cited

U.S. PATENT DOCUMENTS

| | | | |
|---|---|---|---|
| 2020/0107003 A1* | 4/2020 | Phillips | H04N 19/162 |
| 2020/0128255 A1* | 4/2020 | Halepovic | H04L 65/80 |
| 2020/0128293 A1* | 4/2020 | Mittal | H04N 21/643 |
| 2020/0186615 A1* | 6/2020 | Halepovic | H04L 41/5067 |

* cited by examiner

Table 1

| Average Bandwidth | Time Periods |
|---|---|
| 14.5 Mbps | 00~03 (T0) |
| 18.8 Mbps | 03~06 (T3) |
| 19.1 Mbps | 06~09 (T6) |
| 16.4 Mbps | 09~12 (T9) |
| 13.2 Mbps | 12~15 (T12) |
| 10.5 Mbps | 15~18 (T15) |
| 6.8 Mbps | 18~21 (T18) |
| 8.9 Mbps | 21~24 (T21) |

Table 2

| Movie Type | Min/PerMon |
|---|---|
| Science Fiction | 44 Mins |
| Comedy | 0 Min |
| Romance | 5 Mins |
| Variety | 153 Mins |
| Horror | 95 Mins |
| Detective Reasoning | 178 Mins |
| Funny | 357 Mins |
| Anime | 243 Mins |

Fig. 3

Table 3

| $B_{S1}$ | | $B_{S2}$ | | $B_{Total}$ | Priority |
|---|---|---|---|---|---|
| 2M | + | 5M | = | 7M | 1 |
| 900K | + | 5M | = | 5.9M | 2 |
| 2M | + | 3M | = | 5 M | 3 |
| 900K | + | 3M | = | 3.9 M | 4 |
| 2M | + | 1.2M | = | 3.2 M | 5 |
| 900K | + | 1.2M | = | 2.1 M | 6 |
| ~~4M~~ | + | ~~5M~~ | = | ~~9 M~~ | ~~X (S1 480P)~~ |
| ~~4M~~ | + | ~~3M~~ | = | ~~7 M~~ | ~~X (S1 480P)~~ |
| ~~4M~~ | + | ~~1.2M~~ | = | ~~5.2 M~~ | ~~X (S1 480P)~~ |

Fig. 4

METHOD FOR SHAPING VIDEO STREAMS AND SET-UP BOX USING THE METHOD

FIELD

The subject matter herein generally relates to communication technologies, and especially to a method for shaping video stream traffic and a set-up box using the method.

BACKGROUND

Adaptive bitrate streaming (ABS) is a technique used in streaming multimedia over computer networks. Video or audio streaming technologies can include streaming protocols such as RTP with RTSP, but today's adaptive streaming technologies are almost exclusively based on HTTP and designed to work efficiently over large distributed HTTP networks such as the Internet. However, ABS is used for only one client. When multi-streaming for multiple clients is required, one stream is non-interactive with the others, so that bandwidth is in effect fully occupied by only some of the clients, this is low usage of network resources.

A known method, for example, to manage multiple adaptive bitrate streaming on client (MMABS) dynamically calculates bandwidth speeds of each of the clients and consider sizes of display regions as foundation of buffer priority. Then network bandwidth is configured to achieve the multi-streaming purpose. This method overcomes drawbacks of the ABS but still have problems. First, the buffer size of a client only has three chunks such that the network resources cannot be effectively used. Next, variable factors for the network bandwidth of multiple clients are increased, resulting in more bitrate changes, which is hard to control. Finally, movie requirements are limited to the size of a single display window, which is not optimal for users.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views. Implementations of the present technology will now be described, by way of example only, with reference to the attached figures, wherein:

FIG. 3 is a block diagram of an exemplary embodiment of average bandwidth of movie watched at different time periods and cumulative time of different types of movies in each time period;

FIG. 4 is a block diagram of an exemplary embodiment of bitrate combinations.

DETAILED DESCRIPTION

Figure 1:
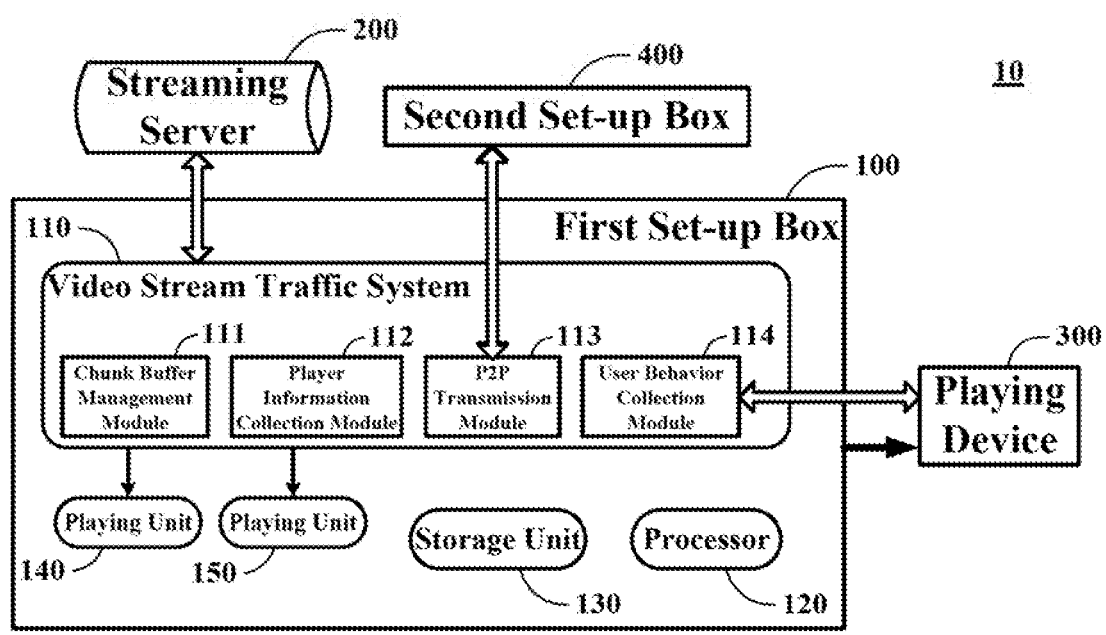
FIG. 1 is a block diagram of an exemplary embodiment of functional blocks of a system for shaping video streams.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

An embodiment of a method for shaping video streams and a set-up box using the method provides recording of bandwidth speeds to determine an initial bitrate of a video stream, collecting watching time periods of different types of movies to configure various buffer sizes, and providing higher buffer priorities to desired video streams. Bitrate information of video streams is analyzed to calculate bitrate combinations according to frame sizes of the video streams and buffer states of the video streams are monitored in determining to download the next image chunk in real-time according to frame sizes from the video streams. Bitrates may be switched based on the buffer states of the video streams and downloading time of a single chunk and stream buffers are shared via point-to-point (P2P) protocol.

An embodiment of the method for shaping video streams provides the following advantages: determining initial bitrates of each of the video streams based on current and previous streaming information to avoid a low bitrate as a video stream starts to play; considering the overall streaming requirements to better utilize the bandwidth; monitoring buffer states of each of the video streams and downloading buffer speeds to switch bitrates that enables robust and stable streaming; configuring buffer sizes according to user behavior and frames sizes so that more important video streams have higher buffer priorities; and providing best benefits to the streaming buffer contents via P2P.

FIG. 1 is a block diagram of an exemplary embodiment of functional blocks of a system for shaping video streams.

An embodiment of the system for shaping video streams comprises a first set-up box 100, a streaming server 200, and a playing device 300, such as a television. The first set-up box 100 further comprises a video stream traffic system 110, a processor 120, a storage unit 130, and playing units 140 and 150. The video stream traffic system 110 further comprises a chunk buffer management module 111, a player information collection module 112, a P2P transmission module 113, and a user behavior collection module 114. In this embodiment, the playing units 140 and 150 can be application programs (APPs) such as iQIYI, Netflix, and so on.

The one or more functional modules 111-114 and units 140 and 150 can include computerized code in the form of one or more programs of the first set-up box 100 that are stored in the storage unit 130, and executed by the processor 120 to provide functions of the system. The storage unit 130 can be a dedicated memory, such as an EPROM or a flash memory.

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Figure 2:
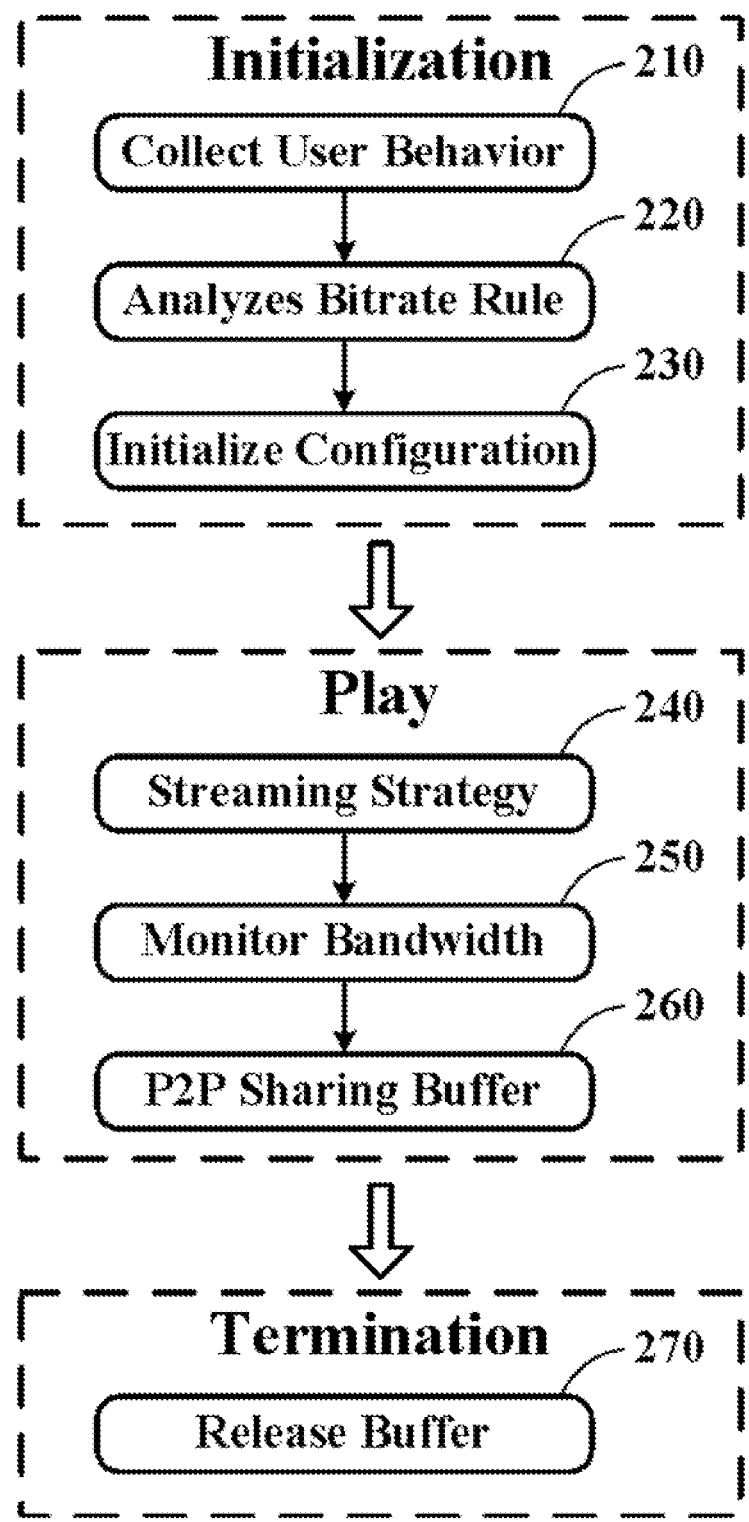
FIG. 2 is a workflow of an exemplary embodiment of functional blocks of a method for shaping video streams.

FIG. 2 is a workflow of an exemplary embodiment of functional blocks of a method for shaping video streams. The player information collection module 112 collects uniform resource locator (URL) records to which the playing units 140 and 150 connect, bitrates of the playing units 140 and 150, and frame sizes of current video streams, and transmits the collected information to the chunk buffer management module 111.

The user behavior collection module 114 collects user history of watching movies (210), comprising average bandwidth of movie watching at different time periods and cumulative time of different types of movies at each time period, for example, in a month. The average bandwidth at different time periods is used to determine initial configuration, while the cumulative time affects subsequent buffer adjustments. Referring to FIG. 3, for example, 24 hours are divided into 8 3-hour time sections, comprising T0, T3, . . . , T18 and T21. The average bandwidth of each of the time periods is shown in Table 1, while the cumulative time of each of the time periods is shown in Table 2. The user behavior collection module 114 transmits the user behavior information to the chunk buffer management module 111.

The chunk buffer management module 111 analyzes bitrate combinations according to the user history and the playing information (220). For example, a first video source $S_1$ of the playing unit 140, for example iQIYI, and a second video source $S_2$ of the playing unit 150, for example Netflix, are played in the same device, for example TV 300. The images of the first video source $S_1$ are displayed with a smaller frame size, while the images of the second video source $S_2$ are displayed with a greater frame size.

In an embodiment, available bitrates of the first video source $S_1$ ($B_{S1}$) comprise 900K, 2M, and 4M with a maximum resolution of 480P ($B_{MAX}$2M), while available bitrates of the second video source $S_2$ ($B_{S2}$) comprise 1.2M, 3M, and 5M with a maximum resolution of 1080P ($B_{MAX}$6M). Therefore, when the first video source $S_1$ and the second video source $S_2$ are simultaneously played, 9 available bitrate combinations are provided, as shown in Table 3 of FIG. 4. Bitrate combinations of the first video source $S_1$ exceeding 2M and the second video source $S_2$ exceeding 6M are deleted, what remains has 6 bitrate combinations and display priorities for each of the bitrate combinations are defined, as shown in FIG. 4. Since the images of the second video source $S_2$ are displayed with a greater frame size, the display priorities are set according to the bitrates of the second video source $S_2$, generating priority orders as shown in Table 3 of FIG. 4. The display priorities of the bitrate combinations can also be set by other conditions.

The chunk buffer management module 111 performs initial configurations according to the analyzed bitrate combinations (230), and configures corresponding buffer sizes to each of the time periods of the first video source $S_1$ and the second video source $S_2$. For example, a buffer size with a priority "2" is configured to the time period T18 that the buffer size of the first video source $S_1$ is 900K and the buffer size of the second video source $S_2$ is 5M. In addition, the chunk buffer management module 111 configures different buffer sizes to different types of movies, the minimum buffer unit is 6 chunks, $C_{Min}=6$, and the maximum buffer unit is 60 chunks, $C_{Max}=60$, and the time length of a chunk is 10 seconds. Further, current buffer levels of the first video source $S_1$ and the second video source $S_2$ are defined. Images from a video source which are buffered and accumulated between 0% and 30% (a first buffer value) are defined as a low buffer level ($BL_{Mid}$); the images of the video source which are buffered and accumulated between 30% (the first buffer value) and 70% (the second buffer value) are defined as a middle buffer level ($BL_{Mid}$); and the images of the video source which are buffered and accumulated between 70% (the second buffer value) and 100% are defined as a high buffer level ($BL_{High}$).

When such activation is complete, the chunk buffer management module 111 starts to display the video images according to streaming strategies (240) as follows.

The video source with a lower ratio is selected from between the first video source $S_1$ and the second video source $S_2$ for downloading image chunks. For example, the buffer size of the first video source $S_1$ is defined as 36 image chunks, currently 14 image chunks are downloaded, and, thus, the buffer ratio of the first video source $S_1$ is 14/36 ($C_{Current}/C_{Max}$) which is about 39%, this belongs to the middle buffer level ($BL_{Mid}$). The buffer size of the second video source $S_2$ is defined as 12 image chunks, currently 3 image chunks are downloaded, and, thus, the buffer ratio of the second video source $S_2$ is 3/12 ($C_{Current}/C_{Max}$) which is 25%. This belongs to the low buffer level ($BL_{Low}$). The buffer ratio of the second video source $S_2$ is lower so image chunks are downloaded from the second video source $S_2$.

When the buffer ratios of the two video sources are almost the same, the video source with a greater frame size is selected. The frame size of the first video source $S_1$ is defined as 480P. The frame size of the second video source $S_2$ is defined as 1080P. The frame size of the first video source $S_1$ is greater than that of the second video source $S_2$ so image chunks are continued to be downloaded from the second video source $S_2$.

When both of the buffer ratios of the two image sources are at the low state ($BL_{Low}$), indicating the network traffic is congested, both of the buffer bitrates are decreased.

When both of the buffer ratios of the two image sources are at the high state ($BL_{High}$), indicating the network traffic is smooth, both of the buffer bitrates are decreased.

When both of the buffer ratios of the two image sources are at the middle state (BLMid), the buffer bitrates are not changed.

Additionally, desired movies and the movies with greater frame sizes are defined with higher buffer priorities.

As movies are played, the chunk buffer management module 111 monitors bandwidth of the video streams. A downloading time of an image chunk of the first video source $S_1$ and a downloading time of an image chunk of the second video source $S_2$ is recorded. The downloading time of an image chunk serves as a buffer threshold, generally preset as 10 seconds. If the buffer ratios of the first video source $S_1$ and the second video source $S_2$ are at the high state ($BL_{High}$) and the downloading time of each image chunk is less than 10 seconds, the bitrates of the first video source $S_1$ and the second video source $S_2$ are increased. If the buffer ratios of the first video source $S_1$ and the second video source $S_2$ are at the low state ($BL_{Low}$) and the downloading time of each image chunk is greater than 10 seconds, the bitrates of the first video source $S_1$ and the second video source $S_2$ are decreased.

The P2P transmission module 113 transmits image chunks temporarily stored in its buffer queue (not shown) to the second set-up box 400 via P2P to display the temporarily stored image chunks in another display device connecting to the second set-up box 400 (260). When the number of the temporarily stored image chunks is greater than a preset value, the P2P transmission module 113 activates the P2P operation. The P2P transmission module 113 comprises multiple buffer queues (not shown), each of the buffer queues corresponds to a movie type.

When the movie is finished, the chunk buffer management module 111 releases the image chunks in the buffers of the first video source $S_1$ and the second video source $S_2$ (270).

Figure 5:
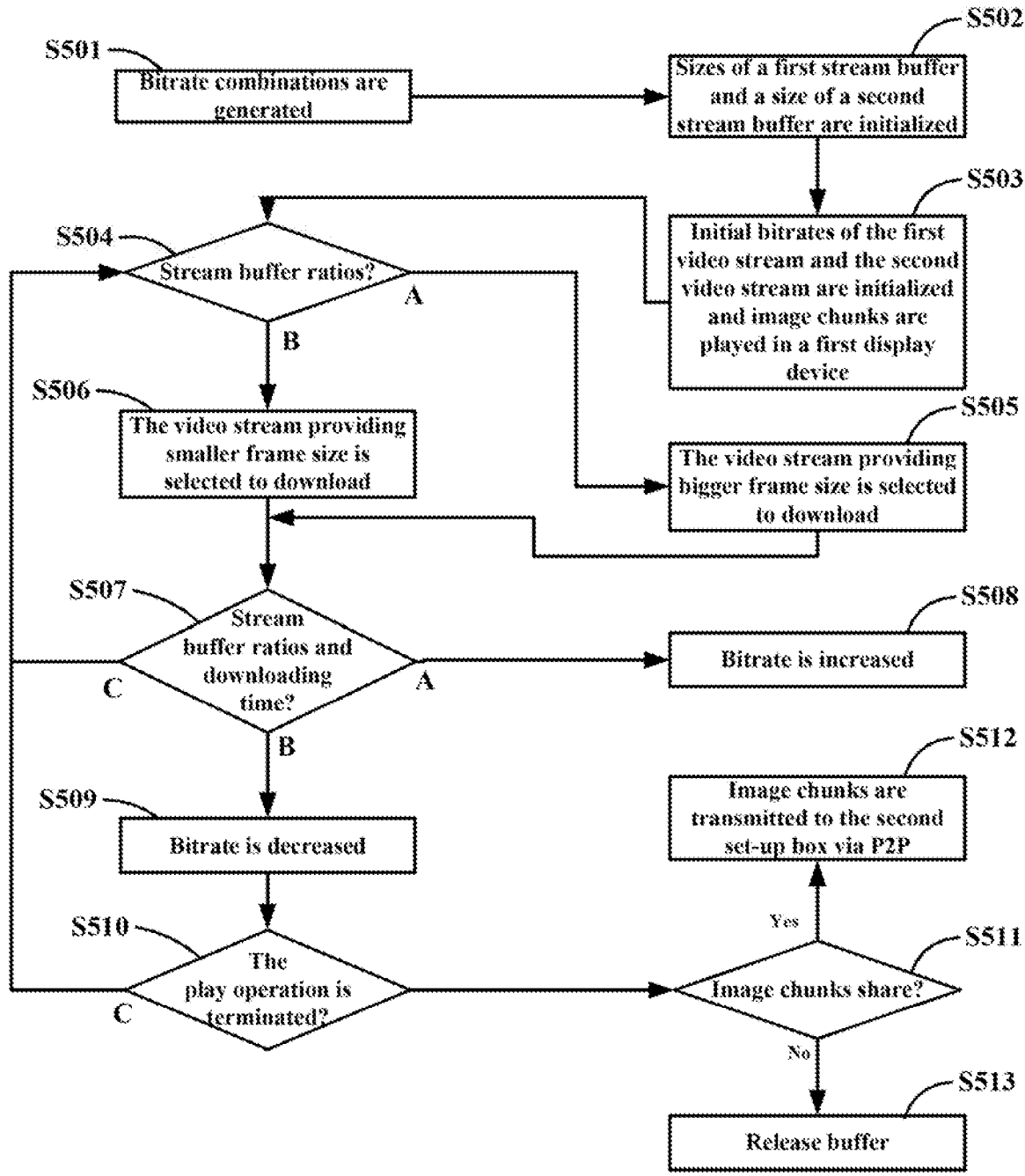
FIG. 5 is a flowchart of an exemplary embodiment of a method for shaping video streams.

FIG. 5 is a flowchart of an exemplary embodiment of a method for shaping video streams, applied to a first set-up box.

In step S501, user behavior information and display information are collected and analyzed to generate multiple bitrate combinations.

In step S502, at least a size of a first stream buffer of a first video stream and a size of a second stream buffer of a second video stream are initialized according to the bitrate combinations. The size of the first stream buffer is less than the size of the second stream buffer.

In step S503, initial bitrates of the first video stream and the second video stream are initialized according to historical bandwidth records and the bitrate combinations, multiple first image chunks of the first video stream are downloaded and stored in the first stream buffer, multiple second image chunks of the second video stream are downloaded and stored in the second stream buffer, and the first image chunks and the second image chunks are played in a first display device connecting to the first set-up box.

In step S504, stream buffer ratios of the first video stream and the second video stream are determined.

In step S505, when the stream buffer ratio of the first video stream is equal to other of the second video stream, the second video stream is selected to continue downloading the second image chunks.

In step S506, when the stream buffer ratio of the first video stream is not equal to other of the second video stream, one of the first and second video stream which has a smaller stream buffer ratio is selected to continue downloading the first image chunks or the second image chunks.

In step S507, the stream buffer ratios of the first video stream and the second video stream and a first downloading time of each of the first image chunks and a second downloading time of each of the second image chunks are determined. When the stream buffer ratios of the first video stream and the second video stream are the same, the process proceeds to step S504 (C).

In step S508, if the stream buffer ratios of the first video stream and the second video stream are greater than a second buffer value (A) and the first and second downloading time of each of the first and second image chunks are less than a preset value, for example, 10 seconds, the bitrates of the first video stream and the second video stream are increased.

In step S509, if the stream buffer ratios of the first video stream and the second video stream are less than a first buffer value (B) and the first and second downloading time of each of the first and second image chunks are greater than the preset value, the bitrates of the first video stream and the second video stream are decreased.

In step S510, it is determined whether the play operation is terminated, and, if not, the process proceeds to step S504 (C).

In step S511, if the play operation is terminated, it is then determined whether the first image chunks currently stored in the first stream buffer and the second image chunks currently stored in the second stream buffer are shared.

In step S512, if the currently stored first image chunks and the currently stored second image chunks are shared, the currently stored first image chunks and the currently stored second image chunks are transmitted to a second set-up box via P2P and displayed in a second display device connecting to the second set-up box.

In step S513, if the currently stored first image chunks and the currently stored second image chunks are not shared or have been transmitted to the second set-up box, the first stream buffer and the second stream buffer are released and emptied.

The embodiments shown and described above are only examples. Many other details are found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail. It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A method for shaping video stream traffic, applied to a first set-up box, comprising:
    collecting and analyzing user behavior information and play information to generate multiple bitrate combinations;
    initializing at least a size of a first stream buffer of a first video stream and a size of a second stream buffer of a second video stream according to the bitrate combinations, wherein the size of the first stream buffer is less than the size of the second stream buffer;
    initializing initial bitrates of the first video stream and the second video stream according to historical bandwidth records and the bitrate combinations;
    downloading and storing multiple first image chunks of the first video stream in the first stream buffer, downloading and storing multiple second image chunks of the second video stream in the second stream buffer, and playing the first image chunks and the second image chunks in a first display device connecting to the first set-up box;
    determining stream buffer ratios of the first video stream and the second video stream;
    when the stream buffer ratio of the first video stream is equal to other of the second video stream, selecting the second video stream to continue downloading the second image chunks;
    when the stream buffer ratio of the first video stream is not equal to other of the second video stream, selecting one of the first and second video stream which has a smaller stream buffer ratio to continue downloading the first image chunks or the second image chunks;
    determining the stream buffer ratios of the first video stream and the second video stream and a first downloading time of each of the first image chunks and a second downloading time of each of the second image chunks;

if the stream buffer ratios of the first video stream and the second video stream are greater than a second buffer value and the first and second downloading time of each of the first and second image chunks are less than a preset value, increasing the bitrates of the first video stream and the second video stream;

if the stream buffer ratios of the first video stream and the second video stream are less than a first buffer value and the first and second downloading time of each of the first and second image chunks are greater than the preset value, decreasing the bitrates of the first video stream and the second video stream;

determining whether the play operation is terminated;

if the play operation is terminated, determining whether the first image chunks currently stored in the first stream buffer and the second image chunks currently stored in the second stream buffer are shared; and if the currently stored first image chunks and the currently stored second image chunks are shared, transmitting, to a second set-up box, and displaying the currently stored first image chunks and the currently stored second image chunks in a second display device connecting to the second set-up box.

2. A set-up box, comprising:

at least one processor;

a non-transitory storage medium system coupled to at least the one processor and configured to store one or more programs that are to be executed by the at least one processor, the one or more programs comprises instructions for:

collecting and analyzing user behavior information and play information to generate multiple bitrate combinations;

initializing at least a size of a first stream buffer of a first video stream and a size of a second stream buffer of a second video stream according to the bitrate combinations, wherein the size of the first stream buffer is less than the size of the second stream buffer;

initializing initial bitrates of the first video stream and the second video stream according to historical bandwidth records and the bitrate combinations;

downloading and storing multiple first image chunks of the first video stream in the first stream buffer, downloading and storing multiple second image chunks of the second video stream in the second stream buffer, and playing the first image chunks and the second image chunks in a first display device connecting to the first set-up box;

determining stream buffer ratios of the first video stream and the second video stream;

when the stream buffer ratio of the first video stream is equal to other of the second video stream, selecting the second video stream to continue downloading the second image chunks;

when the stream buffer ratio of the first video stream is not equal to other of the second video stream, selecting one of the first and second video stream which has a smaller stream buffer ratio to continue downloading the first image chunks or the second image chunks;

determining the stream buffer ratios of the first video stream and the second video stream and a first downloading time of each of the first image chunks and a second downloading time of each of the second image chunks;

if the stream buffer ratios of the first video stream and the second video stream are greater than a second buffer value and the first and second downloading time of each of the first and second image chunks are less than a preset value, increasing the bitrates of the first video stream and the second video stream;

if the stream buffer ratios of the first video stream and the second video stream are less than a first buffer value and the first and second downloading time of each of the first and second image chunks are greater than the preset value, decreasing the bitrates of the first video stream and the second video stream;

determining whether the play operation is terminated;

if the play operation is terminated, determining whether the first image chunks currently stored in the first stream buffer and the second image chunks currently stored in the second stream buffer are shared; and if the currently stored first image chunks and the currently stored second image chunks are shared, transmitting, to a second set-up box, and displaying the currently stored first image chunks and the currently stored second image chunks in a second display device connecting to the second set-up box.

* * * * *